United States Patent [19]

Rechsteiner

[11] Patent Number: 4,991,253
[45] Date of Patent: Feb. 12, 1991

[54] INDUSTRIAL CENTRAL-VACUUM SYSTEM
[75] Inventor: Ernst Rechsteiner, Uzwil, Switzerland
[73] Assignee: Steinemann AG, Flawil, Switzerland
[21] Appl. No.: 464,514
[22] Filed: Jan. 12, 1990

Related U.S. Application Data

[63] Continuation-in-part of Ser. No. 204,193, Jun. 8, 1988, abandoned.

[30] Foreign Application Priority Data

Jun. 18, 1987 [CH] Switzerland .................... 02294/87-8

[51] Int. Cl.$^5$ ............................................... A47L 5/38
[52] U.S. Cl. ........................................ 15/301; 15/314; 15/319
[58] Field of Search ................... 15/301, 314, 319, 339

[56] References Cited

U.S. PATENT DOCUMENTS

| | | | |
|---|---|---|---|
| 3,314,098 | 4/1967 | Carsey | 15/301 |
| 4,225,272 | 9/1980 | Palmovist | 15/314 X |
| 4,514,874 | 5/1985 | Kurz | 15/319 |

FOREIGN PATENT DOCUMENTS

| | | | |
|---|---|---|---|
| 1149868 | 6/1963 | Fed. Rep. of Germany | 15/314 |
| 2016194 | 10/1971 | Fed. Rep. of Germany | 15/339 |
| 2734051 | 2/1979 | Fed. Rep. of Germany | 15/339 |
| 2819193 | 11/1979 | Fed. Rep. of Germany | 15/339 |
| 3041167 | 5/1982 | Fed. Rep. of Germany | 15/339 |
| 2081936 | 2/1982 | United Kingdom | 15/319 |
| 2082351 | 3/1982 | United Kingdom | 15/319 |

Primary Examiner—Chris K. Moore
Attorney, Agent, or Firm—Herbert Dubno; Andrew Wilford

[57] ABSTRACT

An industrial central vacuum system has a filter chamber having an intake port connectable to a plurality of intake nozzles and an output port, a multispeed blower having an intake side and an output side and energizable for drawing in air at its intake side and expelling it at its output side, a conduit connected between the intake side of the blower and the output port of the filter chamber, and a valve having an outer side opening to ambient pressure and an inner side opening into the conduit. Thus when the valve is open ambient air can be admitted directly into the conduit. A controller is between the blower and the valve for opening the valve prior to energizing and de-energizing the blower and for closing the valve a predetermined interval after energizing the blower. A pressure sensor is provided in the conduit and the blower is operable at a high speed corresponding to a relatively large blower throughput and at a low speed corresponding to a relatively small blower throughput. The controller is also connected to the pressure sensor to open the valve for a predetermined short period of time on switching the valve from the low speed to the high speed. The controller switches the blower from low-speed operation to high-speed operation when pressure in the conduit detected by the sensor drops below a predetermined intermediate threshold level.

9 Claims, 1 Drawing Sheet

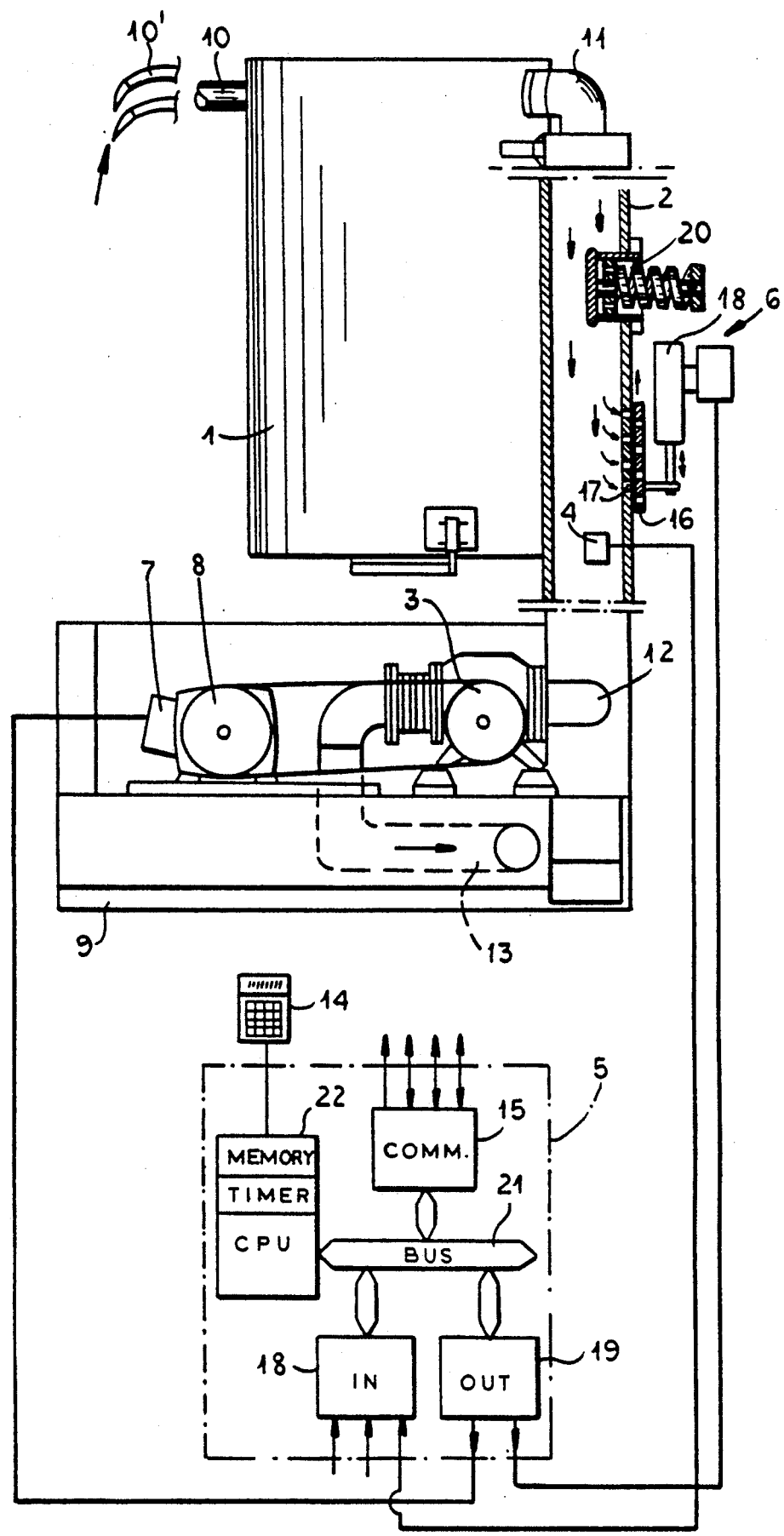

INDUSTRIAL CENTRAL-VACUUM SYSTEM

CROSS REFERENCE TO RELATED APPLICATION

This application is a continuation-in-part of patent application Ser. No. 07/204,193 filed June 8, 1988, now abandoned.

FIELD OF THE INVENTION

The present invention relates to a centralized vacuum system. More particularly this invention concerns such a system used in an industrial setting, for instance in a textile mill, and a method of operating the system.

BACKGROUND OF THE INVENTION

It is known, for instance from German patent document No. 2,819,193 filed May 2, 1978 by F. Voigt et al to control the motor driving the vacuum blower of a vacuum cleaner by means of a standard diac-triac voltage controller whose setting potentiometer is in turn controlled in accordance with pressure in the cleaner's hose. Thus pressure at the intake port of the system is detected and when it increases the blower speed is decreased and when it decreases the pressure is increased to keep it fairly uniform. In this manner, for instance, when a nozzle connected to the vacuum cleaner moves from a smooth floor where it fits relatively well so that high suction can be developed with a low motor speed to a shag rug with considerable leakage, motor speed in increased to compensate for the increased leakage.

As applied to industrial systems, for instance in a textile mill where a common intake duct may be connected to a plurality of intake ports that can each be fitted with a hose and nozzle for aspirating particles or fibers at different locations in the plant, such a system is inadequate. The large typically three-phase motor that drives such an industrial system cannot be shifted so readily to match its speed to vacuum requirements, and in fact the inertia of the system makes control fairly difficult. In particular it is possible when the system is started to overload and stall the drive motor as it works against a substantial suction head, while this head can reverse-drive the motor when the system is shut down to cause flow in the system to reverse momentarily, a phenomenon called puffback.

OBJECTS OF THE INVENTION

It is therefore an object of the present invention to provide an improved industrial-type central vacuum system.

Another object is the provision of such an improved industrial-type central vacuum system which overcomes the above-given disadvantages, that is which allows even a heavy-duty system to be controlled in accordance with suction requirements.

A further object is to provide such a system which can protect the system as it is started up and shut down.

SUMMARY OF THE INVENTION

An industrial central vacuum system according to this invention has a filter chamber having an intake port connectable to a plurality of intake nozzles and an output port, a multispeed blower having an intake side and an output side and energizable for drawing in air at its intake side and expelling it at its output side, a conduit connected between the intake side of the blower and the output port of the filter chamber, and a valve having an outer side opening to ambient pressure and an inner side opening into the conduit. Thus when the valve is open ambient air can be admitted directly into the conduit. A controller is between the blower and the valve for opening the valve prior to energizing and de-energizing the blower and for closing the valve a predetermined interval after energizing the blower.

Thus with the system of this invention when the blower is started it does not have to operate against a vacuum, so that it can get up to speed before it has to work against a load. When the system is shut down the motor similarly is not working against a load, since the pressure upstream will be atmospheric like the pressure downstream, so that there Will be no puffback caused by the vacuum in the system reverse-driving the blower.

In accordance with a further feature of this invention a pressure sensor is provided in the conduit and the blower is operable at a high speed corresponding to a relatively large blower throughput and at a low speed corresponding to a relatively small blower throughput. The controller is also connected to the pressure sensor to open the valve for a predetermined short period of time on switching the valve from the low speed to the high speed. The controller switches the blower from low-speed operation to high-speed operation when pressure in the conduit detected by the sensor drops below a predetermined intermediate threshold level. Furthermore the controller switches the blower from high-speed operation to low-speed operation when pressure in the conduit detected by the sensor stays at a predetermined relatively high threshold level for a predetermined time.

In a system where the blower can operate at three speeds, that is a 100% full-load speed, a 55% partial-load speed, and a 15% standby speed the operation is as follows:

If the vacuum in the conduit 2 remains at a relatively high level (about $-325$ mbar) for more than 3 min, the motor is shifted down. This can occur from full-load to partial-load or from partial-load to standby. During the downshift the valve 6 is opened for about 10 sec. The downshift threshold for switching from full load to partial load can be substantially higher, for example $-375$ mbar.

If while running at partial load the pressure in the conduit 2 drops below an intermediate level (about $-275$ mbar) the motor shifts up to full-load, with the valve 6 opening briefly during the upshift.

If while running at standby (at about $-100$ mbar vacuum) the pressure drops below a relatively low level (about $-95$ mbar) the motor shifts up to partial-load, with valve 6 opening staying closed during the upshift.

Thus with this system the motor driving the blower is also protected during speed changes so that it can, once again, get up to its new speed each time speed is increased.

The blower according to this invention is driven by a three-phase motor and the controller connects it in a Y configuration for low-speed operation and in a Δ configuration for high-speed operation.

DESCRIPTION OF THE DRAWING

The above and other objects, features, and advantages will become more readily apparent from the following, reference being made to the accompanying drawing whose sole FIGURE is a partly diagrammatic and partly sectional illustration of the system according to this invention.

SPECIFIC DESCRIPTION

As seen in the drawing, a central vacuum system has a standard filter chamber 1 having an input 10 that can be connected to a plurality of nozzles 10' and an output 11 that feeds into the top of a support conduit 2 from which the chamber 1 is hung. The system has a stationary base 9 supporting a roots blower 3 having an input connected to the lower end of the conduit 2 and an output 13 that is normally vented outside. A three-phase motor 8 carried on the base 9 is connected to the blower 3 to drive it so as to take in gas at the intake 12 and exhaust it at 13, this motor 8 being provided with a speed controller 7 that can switch it between a Y connection and a Δ connection and that can set three levels of operation: full-load or 100%, partial-load or 55%, and standby or 15%.

The column/conduit 2 is provided with a safety valve 20 that is spring loaded and set to open when the vacuum inside the conduit 2 exceeds about −380 mbar. This valve 20 is wholly mechanical and serves to protect the motor 8 against overload.

In the conduit 2, which is substantially closed except to the chamber output 11 and pump input 12, is provided with a vent valve 6. This is formed by holes 17 in the wall of the conduit 2 which can be covered and blocked by a perforated plate 16 controlled by an electric linear actuator 18. In one end position of this plate 16 the holes 17 are all blocked and in an the opposite position they are all open to the outside.

A controller 5 has an output module 19 connected to the motor-speed control 7 and to the valve 6 and an input module 18 connected to a pressure sensor 4 inside the conduit 2 and slightly downstream of the valve 6. This controller 5, which is of the SAIA ® PC type sold by Landis & Gyr incorporates a timing, memory, and CPU circuit 22 all connected by a bus 21 to the modules 18 and 19 and can be programmed via an external input device 14. It also includes a communication module 15 that can be connected to an external printer monitor, terminal, or the like. It monitors pressure inside the conduit 2 and operates the motor 8 and valve 6 in accordance with the pressure as follows:

On startup the controller 5 first opens the valve 6 and then starts the motor 8 in partial-load mode, with a Δ connection. The valve 6 is closed again 10 sec after the motor 8 is started. Such opening of the valve 6 mitigates shocks to the system and to the motor 8, so that the motor 8 does not have to work against a substantial negative pressure and so that the various conduits are not subjected to pressure shocks.

Presuming that no nozzles 10' are connected so that in effect the input 10 is closed, the vacuum in the system will quickly rise to about −380 mbar, being prevented from exceeding this level substantially by opening of the valve 20. If after 3 min the pressure is still at this high level, the controller 5 automatically switches the motor 8 back to standby mode which maintains a vacuum in the conduit of about −95 mbar. The valve 6 is opened to drop the pressure in the system to about −100 mbar for this downshift from partial-load to standby mode. On the shift from partial-load to standby mode the motor 8 is shifted from a Δ to a Y connection.

Should the pressure in standby mode drop below about −95 mbar as detected by the sensor 4, as for instance when a nozzle 10' is hooked up to the input 10, the controller 5 returns the motor 8 to partial-load operation, and if this is insufficient to increase the pressure above −275 mbar, to full-load operation. During this upshift from standby to partial-load mode the valve 6 can stay closed but during the shift from partial- to full-load operation the valve 6 is opened for around 10 sec, to drop the system pressure temporarily to about −100 mbar to reduce the load on the motor 8 during the speed change.

During full-load operation if the pressure remains at about −380 mbar for more than 3 min, the equipment automatically shifts down to partial-load operation and, of course, it similarly switches to standby as described above if at this level the pressure stays at maximum.

Thus the operating pressure for standby mode is about −95 mbar and the range for partial- and full-load operation is −275 mbar to −375 mbar, with partial- or full-load operation being selected depending on the load, that is the number of nozzles connected. Only on upshifting from standby to partial-load operation is the valve 6 left closed; for all other mode changes it is opened to drop the pressure for about 10 sec to about −100 mbar to protect the motor 8 and save energy.

At the end of the operating cycle the machine is shut down by first opening the valve 6 fully and then some 10 sec later shutting off the motor 8. This prevents puffback from the input 10 as the entire system is generally at atmospheric pressure when the blower 3 is stopped.

The following table summarizes the above-described operation:

| Mode change | Valve 6 | Threshold | Motor 8 |
| --- | --- | --- | --- |
| Stop to partial load | Open | n/a | Stop to Δ |
| Standby to partial load | Closed | −95mbar | Y to Δ |
| Partial load to full load | Open | −275mbar | Δ to Δ |
| Full load to partial load | Open | −325mbar | Δ to Δ |
| Partial or full load to standby | Open | −375mbar | Δ to Y |
| Any mode to stop | Open | n/a | Y or Δ to Stop |

Thus with this system the motor speed is automatically set to maintain a modest vacuum in the system during standby operation, which can only occur when nothing is hooked up to the input 10. During normal operation the system is switched between partial-load and full-load operation to maintain a fairly high vacuum in the network, and the motor is down shifted from full-load to partial-load or from partial-load to standby if the system vacuum persists for longer than the 3 min time limit.

The valve 6 mediates speed increases so that same occur without any substantial shock to the system or the motor 8. In addition the valve 6 protects the motor 8 and blower 3 on startup and shutdown.

I claim:
1. An industrial central vacuum system comprising:
 a filter chamber having an intake port connectable to a plurality of intake nozzles and an output port;
 a blower having an intake side and an output side and energizable for drawing in air at its intake side and expelling it at its output side;

a conduit connected between the intake side of the blower and the output port of the filter chamber;

a valve having an outer side opening to ambient pressure and an inner side opening into the conduit, whereby when the valve is open can ambient air be admitted directly into the conduit; and control means connected between the blower and the valve for opening the valve prior to energizing and de-energizing the blower and for closing the valve a predetermined interval after energizing the blower.

2. The industrial central vacuum system defined in claim 1, further comprising a pressure sensor in the conduit, the blower being operable at a high speed corresponding to a relatively large blower throughput and at a low speed corresponding to a relatively small blower throughput, the control means also being connected to the pressure sensor for opening the valve for a predetermined short period of time on switching the blower between the low speed and the high speed.

3. The industrial central vacuum system defined in claim 2 wherein the control means switches the blower from low-speed operation to high-speed operation when pressure in the conduit detected by the sensor drops below a predetermined intermediate threshold level.

4. The industrial central vacuum system defined in claim 3 wherein the control means switches the blower from high-speed operation to low-speed operation when pressure in the conduit detected by the sensor stays at a predetermined relatively high threshold level for a predetermined time.

5. The industrial central vacuum system defined in claim 3 wherein the blower includes a three-phase motor and the control means connects it in a Δ configuration for high-speed operation and in a Y configuration for low-speed operation.

6. A method of operating an industrial central vacuum system comprising:

a filter chamber having an intake port connectable to a plurality of intake nozzles and an output port;

a blower having an intake side and an output side and energizable for drawing in air at its intake side and expelling it at its output side;

a conduit connected between the intake side of the blower and the output port of the filter chamber; and a valve having an outer side opening to ambient pressure and an inner side opening into the conduit, whereby when the valve is open can ambient air be admitted directly into the conduit;

the method comprising the steps of normally operating the blower with the valve closed, and opening the valve prior to energizing and de-energizing the blower and closing the valve a predetermined interval after energizing the blower.

7. The method defined in claim 6 wherein the blower includes a multispeed motor and can be operated at a high speed corresponding to a relatively large throughput and at a low speed corresponding to a relatively low throughput, the method further comprising the step of:

opening the valve briefly while switching the motor from the low speed to the high speed but maintaining it closed when switching from the high speed to the low speed.

8. A method of operating an industrial central vacuum system comprising:

a filter chamber having an intake port connectable to a plurality of intake nozzles and an output port;

a multispeed blower having an intake side and an output side and energizable for drawing in air at its intake side and expelling it at its output side, the blower being operable at a high speed corresponding to a relatively large throughput and at a low speed corresponding to a relatively low throughput;

a conduit connected between the intake side of the blower and the output port of the filter chamber; and a valve having an outer side opening to ambient pressure and an inner side opening into the conduit, whereby when the valve is open can ambient air be admitted directly into the conduit;

the method comprising the steps of normally operating the blower with the valve closed, and opening the valve briefly while switching the blower between the low speed and the high speed.

9. The method defined in claim 8 wherein the valve is opened for about 10 sec when the blower is switched from low speed to high speed.

* * * * *